United States Patent
Amichai et al.

(10) Patent No.: US 9,992,379 B2
(45) Date of Patent: Jun. 5, 2018

(54) PARTIAL SNAPSHOTS FOR CREATING GENERALIZED SNAPSHOTS

(71) Applicant: HEWLETT PACKARD ENTERPRISE DEVELOPMENT LP, Houston, TX (US)

(72) Inventors: Nitsan Amichai, Yehud (IL); Haim Shuvali, Yehud (IL); Michael Gopshtein, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 11 days.

(21) Appl. No.: 15/115,365

(22) PCT Filed: Apr. 10, 2014

(86) PCT No.: PCT/US2014/033597
§ 371 (c)(1),
(2) Date: Jul. 29, 2016

(87) PCT Pub. No.: WO2015/156808
PCT Pub. Date: Oct. 15, 2015

(65) Prior Publication Data
US 2017/0006188 A1 Jan. 5, 2017

(51) Int. Cl.
*G06K 9/00* (2006.01)
*H04N 1/44* (2006.01)
(Continued)

(52) U.S. Cl.
CPC ......... *H04N 1/448* (2013.01); *G06F 11/3438* (2013.01); *G06F 11/366* (2013.01);
(Continued)

(58) Field of Classification Search
CPC . G06F 11/3438; G06F 2201/86; G06K 9/628; H04N 5/3456
See application file for complete search history.

(56) References Cited

U.S. PATENT DOCUMENTS 6,646,680 B1 * 11/2003 Mead ................. H04N 5/23212
348/230.1
7,019,773 B1 3/2006 Heath
(Continued)

FOREIGN PATENT DOCUMENTS

WO WO-9638319 A2 12/1996
WO WO-9827456 A2 6/1998
(Continued)

OTHER PUBLICATIONS

Appsee, "Optimize Your Users' Happiness," (Web Site), 2 pages, retrieved online Mar. 20, 2014 at http://www.appsee.com/.
(Continued)

*Primary Examiner* — Li Liu

(57) ABSTRACT

Example embodiments relate to partial snapshots for creating generalized snapshots. An example method may include, in response to an event, accessing a user interface screen or view associated with an application. The screen or view includes multiple pixels arranged over an area. The method may include sampling the multiple pixels by capturing a portion of the total pixels included in the screen or view. The sampling may include maintaining a dispersion of the captured pixels over the area of the screen or view and preventing clustering of captured pixels within sub-areas of the area. The method may include transmitting the captured portion as a partial snapshot to a system to create a generalized snapshot from the partial snapshot and other partial snapshots.

15 Claims, 5 Drawing Sheets

(51) Int. Cl.
*H04N 5/345* (2011.01)
*G06F 11/36* (2006.01)
*G06F 11/34* (2006.01)
*G06F 21/62* (2013.01)
*G06K 9/62* (2006.01)

(52) U.S. Cl.
CPC ......... *G06F 21/6245* (2013.01); *G06K 9/628* (2013.01); *H04N 1/4446* (2013.01); *H04N 5/3452* (2013.01); *H04N 5/3454* (2013.01); *H04N 5/3456* (2013.01); *G06F 2201/86* (2013.01)

(56) References Cited

U.S. PATENT DOCUMENTS

| | | | |
|---|---|---|---|
| 8,452,814 | B1 | 5/2013 | Yin et al. |
| 2004/0212797 | A1 | 10/2004 | Akiyama |
| 2005/0052551 | A1 | 3/2005 | Tsunoda |
| 2007/0198001 | A1 | 8/2007 | Bauch |
| 2009/0100096 | A1* | 4/2009 | Erlichson ............... H04L 67/02 |
| 2009/0225224 | A1 | 9/2009 | Sung et al. |
| 2010/0079596 | A1 | 4/2010 | Qiu et al. |
| 2010/0208998 | A1* | 8/2010 | Van Droogenbroeck ....... G06K 9/38 382/195 |
| 2010/0245388 | A1 | 9/2010 | Bauch |
| 2011/0214107 | A1 | 9/2011 | Barmeir et al. |
| 2012/0317549 | A1 | 12/2012 | Cunningham et al. |
| 2012/0330127 | A1 | 12/2012 | Aulbach |
| 2013/0183951 | A1 | 7/2013 | Chien |
| 2013/0219365 | A1 | 8/2013 | Rago et al. |
| 2013/0311653 | A1 | 11/2013 | Hernandez et al. |
| 2014/0095600 | A1 | 4/2014 | Needham |
| 2014/0218385 | A1 | 8/2014 | Carmi |
| 2014/0257595 | A1 | 9/2014 | Tillmann |
| 2015/0007024 | A1 | 1/2015 | Jeong |
| 2017/0053397 | A1* | 2/2017 | Chukka .............. G06K 9/00127 |

FOREIGN PATENT DOCUMENTS

| | | |
|---|---|---|
| WO | WO-2011073759 A1 | 6/2011 |
| WO | WO-2014041366 A2 | 3/2014 |
| WO | WO-2015156809 A1 | 10/2015 |

OTHER PUBLICATIONS

Cooley, J. et al.; "Privacy-Preserving Screen Capture: Towards Closing the Loop for Health It Usability," (Research Paper), Jul. 11, 2012, 13 pages, available at http://www.cs.dartmouth.edu/~sws/pubs/cs13.pdf.

GURU99, "Tree & Script View in LoadRunner," (Web Page), 1 page, retrieved online Mar. 20, 2014 at http://www.guru99.com/loadrunner-tutorial-6.html.

Hewlett-Packard Development Company, L.P., "BPM Snapshot on Error," (Web Site), 2 pages, retrieved online Mar. 17, 2014 at http://h30499.www3.hp.com/t5/Application-Perf-Mgmt-BAC-BSM/BPM-Snapshot-on-Error/td-p/5170294#.Usvp3fTeLlc.

Hewlett-Packard Development Company, L.P., "Real User Monitor Application Data Collection Page," 1 page, retrieved online Mar. 20, 2014 at http://update.external.hp.com/HPSoftware/webhelp/bsm/Content/EUM/AdminGuide/rum_app_data_collection.htm.

International Search Report & Written Opinion received in PCT Application No. PCT/US2014/033597, dated Jan. 5, 2015, 9 pages.
International Search Report & Written Opinion received in PCT Application No. PCT/US2014/033600, dated Dec. 31, 2014, 9 pages.

* cited by examiner

PARTIAL SNAPSHOTS FOR CREATING GENERALIZED SNAPSHOTS

BACKGROUND

Applications (e.g., computer software) often include a user interface (UI) component that displays screens to users of the application. A snapshot of an application refers to a screen capture of part or all of the screen presented to the user. Snapshots may be captured by various tools (e.g., testing tools for mobile or web applications) at various times and/or in response to various events (e.g., user actions). A snapshot may be an image file, digital file or some other type of binary data that includes a number of color pixels.

BRIEF DESCRIPTION OF THE DRAWINGS

The following detailed description references the drawings, wherein.

DETAILED DESCRIPTION

Figure 1:
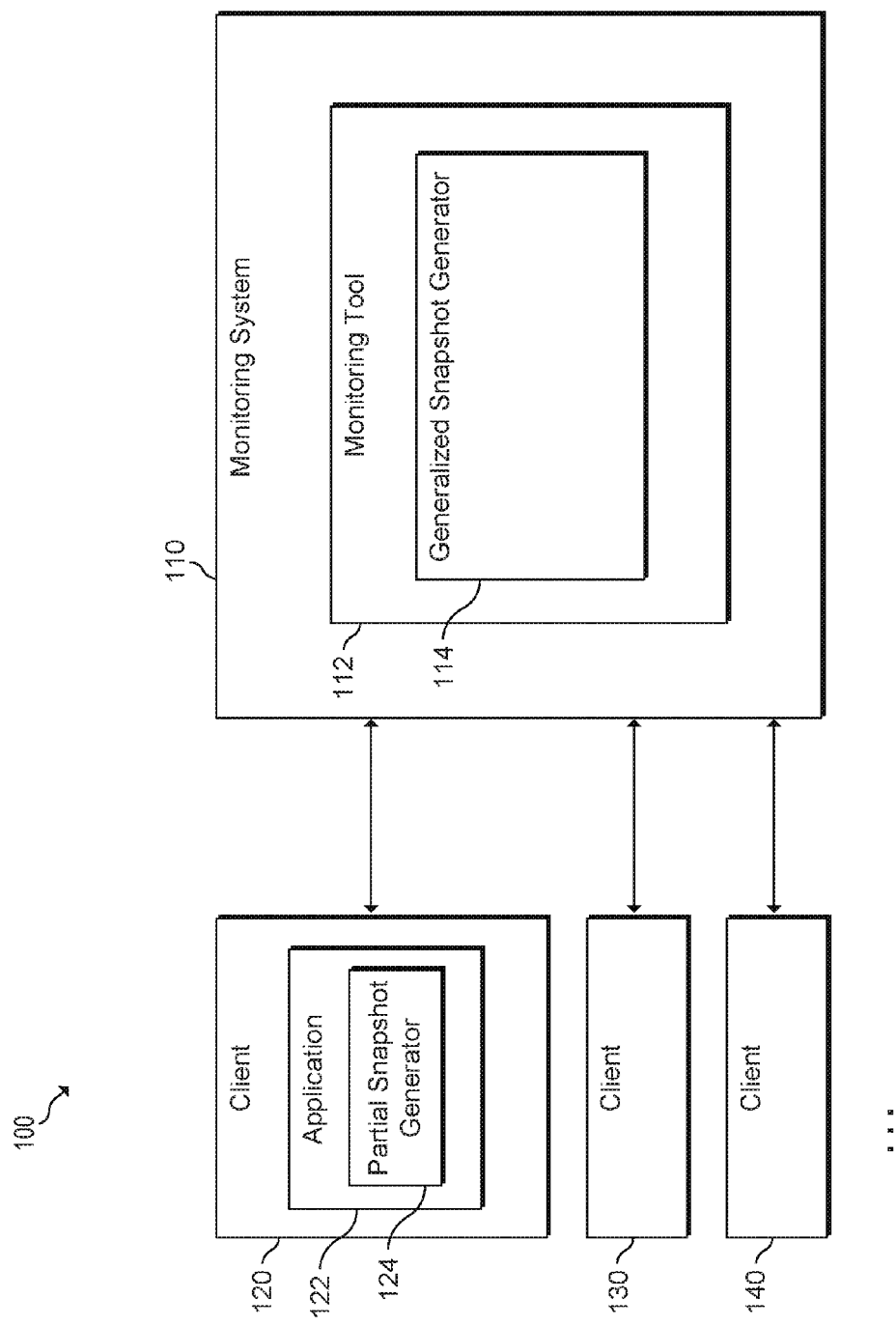
FIG. 1 is a block diagram of an example computing environment in which partial snapshots for creating generalized snapshots may be useful.

Snapshots may be useful for testing an application. For example, a testing tool may capture or record a certain flow of an application (e.g., a series of user actions such as button clicks, etc.) such that the flow can be analyzed. It may be useful for various steps of such a flow to include at least one snapshot, for example, to add application context to a textual description of the step or action. Adding application context via snapshots may allow a user (e.g., a developer or debugger) to better and more quickly understand a performance incident or error. However, when snapshots originate from applications being used by real users, it may be desirable to maintain the users' privacy.

Some pre-production testing tools (e.g., tools that test an application before it is released to real users) may capture screen shots and attach them to a report of the text execution. Because, in these situations, the application is not being used by real users, the application does not contain any personal information that needs to be protected. Such applications may use fake or test information instead of real user information. As such, for each test step or simulated user action, a single screen shot may be attached. These tools do not generate partial snapshots for creating generalized snapshots.

Some production testing tools, or monitoring tools, may also capture screen shots and attach them to a report of the text execution. For example, synthetic monitoring tools may periodically check the status an application (e.g., whether the application is online, available, running, etc.). Additionally, some synthetic monitoring tools may check general functionalities of an application that do not require a user login. Additionally, some synthetic monitoring tools may check functionalities of an application that do require a user login by using a test account instead of a real user account. In all of these situations, no real user information is needed for the testing. As such, for each test step or simulated user action, a single screen shot may be attached. These tools do not generate partial snapshots for creating generalized snapshots.

Some other production testing tools, such as real user monitoring tools, may capture screen shots that are associated with real user actions as real users use the application. In these situations, the snapshots may contain sensitive or private information of the users. For example, a snapshot could include a user's mailing address, account number, credit card information or the like. This may pose a privacy concern for many users, as the users may not trust the developers or debuggers that are using the snapshots. Thus, it may be desirable for real user monitoring tools to use snapshot information while maintaining users' privacy. It may be desirable to create a generalized or scrubbed snapshot that testers or debuggers can use without seeing any sensitive real user information.

The present disclosure describes partial snapshots for creating generalized snapshots. In some examples, a client (e.g., a computing device) may, in response to an event, access a user interface screen or view associated with an application. The screen or view may include multiple pixels arranged over an area. The client may sample the multiple pixels by capturing a portion of the total pixels included in the screen or view. This sampling may include maintaining a dispersion of the captured pixels over the area of the screen or view and preventing clustering of captured pixels within sub-areas of the area. The client may then transmit the captured portion as a partial snapshot to a system to create a generalized snapshot from the partial snapshot and other partial snapshots. The resulting generalized snapshot may be a "generic" or "most representative" (but scrubbed) snapshot based on the screen of multiple real users. The generalized snapshot may preserve the users' privacy by not sending confidential/personal information over a network to the monitoring system.

FIG. 1 is a block diagram of an example computing environment 100 in which partial snapshots for creating generalized snapshots may be useful. Computing environment 100 may include a monitoring system 110 and a number of clients (e.g., 120, 130, 140, etc.). Each client may provide, e.g., at a particular time or in response to a particular event, a partial snapshot to monitoring system 110. Each partial snapshot may be an image file, digital file or some other type of binary data that includes a number of color pixels. The clients may provide the partial snapshots to the monitoring system 110 over at least one network. Such a network may be any wired or wireless network, and may include any number of hubs, routers, switches, cell towers or the like. Such a network may be, for example, part of a cellular network, part of the internet, part of an intranet and/or other type of network. Monitoring system 110 may receive, e.g., at particular times or in response to particular events, the multiple partial snapshots from the various clients (e.g., 120, 130, 140, etc.) and may create a generalized snapshot based on these multiple partial snapshots.

Monitoring system 110 may include at least one computing device that is capable of receiving multiple partial snapshots from the various clients (e.g., 120, 130, 140, etc.) and creating a generalized snapshot. The term "system" may be used to refer to a single computing device or multiple computing devices that communicate with each other (e.g., via a network) and operate together to provide a service. Monitoring system 110 may include a monitoring tool 112 that runs on monitoring system 110.

Monitoring tool 112 may be any type of application testing tool (e.g., a real user monitoring tool) that receives execution information (e.g., execution reports, errors, performance issues, etc.) from various applications (e.g., 122) running on various clients (e.g., 120, 130, 140, etc.). Monitoring tool 112 may also be capable of receiving snapshots and/or partial snapshots that may be attached to or included as part of the received execution information. Monitoring tool 112 may include instructions (e.g., stored on a machine-readable storage medium of system 110) that, when executed (e.g., by a processor of system 110), implement the functionality of the monitoring tool 112. Alternatively or in addition, monitoring tool 112 may include electronic circuitry (i.e., hardware) that implements the functionality of the monitoring tool 112. Monitoring system 110 may include a generalized snapshot generator 114. Generalized snapshot generator 114 may be included as part of monitoring tool 112 or may be independent of (e.g., in communication with) monitoring tool 112.

Generalized snapshot generator 114 may receive multiple partial snapshots from the various clients (e.g., 120, 130, 140, etc.). In particular, generalized snapshot generator 114 may receive partial snapshots from partial snapshot generators (e.g., 124) running on the various clients. Generalized snapshot generator 114 may create a generalized snapshot based on these multiple partial snapshots. More specifically, generalized snapshot generator 114 may group received partial snapshots according to their classification (e.g., a particular UI screen or view, or timestamp, etc.). Then, for each classification, generalized snapshot generator 114 may determine (i.e., resolve), for each target pixel of the generalized snapshot, a final target pixel (i.e., a color value). Generalized snapshot generator 114 may determine each target pixel (e.g., for a particular pixel location of the generalized snapshot) by considering the set of source pixels from the partial snapshots. For a particular target pixel of the generalized snapshot, generalized snapshot generator 114 may determine a color value based on the color values of the relevant set of source pixels from the partial snapshots.

Client 120 may be any type of computing device that is capable of creating partial snapshots and transmitting them, e.g., over a network, to monitoring system 110. Client 120 may be, for example, a smartphone, cell phone, tablet, phablet, laptop, desktop, server, application-specific computing device or any other type of computing device. Client 120 may be described specifically herein, but it should be understood that clients 130, 140 and any other clients in computing environment 100 may be similar to client 120 as described herein. Client 120 may include an application 122 that runs on the client 120. Application 122 may include instructions (e.g., stored on a machine-readable storage medium of client 120) that, when executed (e.g., by a processor of client 120), implement the functionality of the application. Alternatively or in addition, application 122 may include electronic circuitry (i.e., hardware) that implements the functionality of the application. Application 122 may be any type of application, for example, a software program, web browser, web application, mobile application or the like.

Client 120 may include a partial snapshot generator 124. Partial snapshot generator 124 may be included as part of application 122 or may be independent of (e.g., in communication with) application 122. Partial snapshot generator 124 may be part of a larger application execution reporting tool that sends various pieces of execution information regarding applications (e.g., 122) to a monitoring tool (e.g., 112). Partial snapshot generator 124 and/or the larger application execution reporting tool may be provided to users (e.g., creators of applications such as 122) in the form of an SDK (Software Development Kit) library that the users can embed inside their applications. Then when users of the client (e.g., 120) run the application (e.g., 122), the partial snapshot generator 124 and/or the larger application execution reporting tool may be running in the background, for example, to monitor events that happen with regard to the client 120, for example, user actions, timing events, network events, sensor data events (e.g., camera events such as photographs taken) and the like. In some situations, users of client 120 may be notified that their actions may be monitored and may be given the option to opt-in or opt-out of such monitoring.

Partial snapshot generator 124 may, at various times and/or in response to various events (e.g., user actions), create a partial snapshot. The partial snapshot may capture a portion of a screen or view displayed by a user interface (UI) component of application 122. The partial snapshot may be generated in a way such that personal information of the user of the client is protected, as is explained in more detail below (e.g., with regard to pixel sampler 206 of FIG. 2). Partial snapshot generator 124 may provide the partial snapshots to the monitoring system 110 over at least one network. Other clients (e.g., 130, 140, etc.) may also provide partial snapshots to the monitoring system 110 such that the monitoring system 110 may use multiple partial snapshots to create a generalized snapshot. More details regarding the partial snapshot generator may be provided below with regard to the description of partial snapshot generator 200 of FIG. 2.

Figure 2:
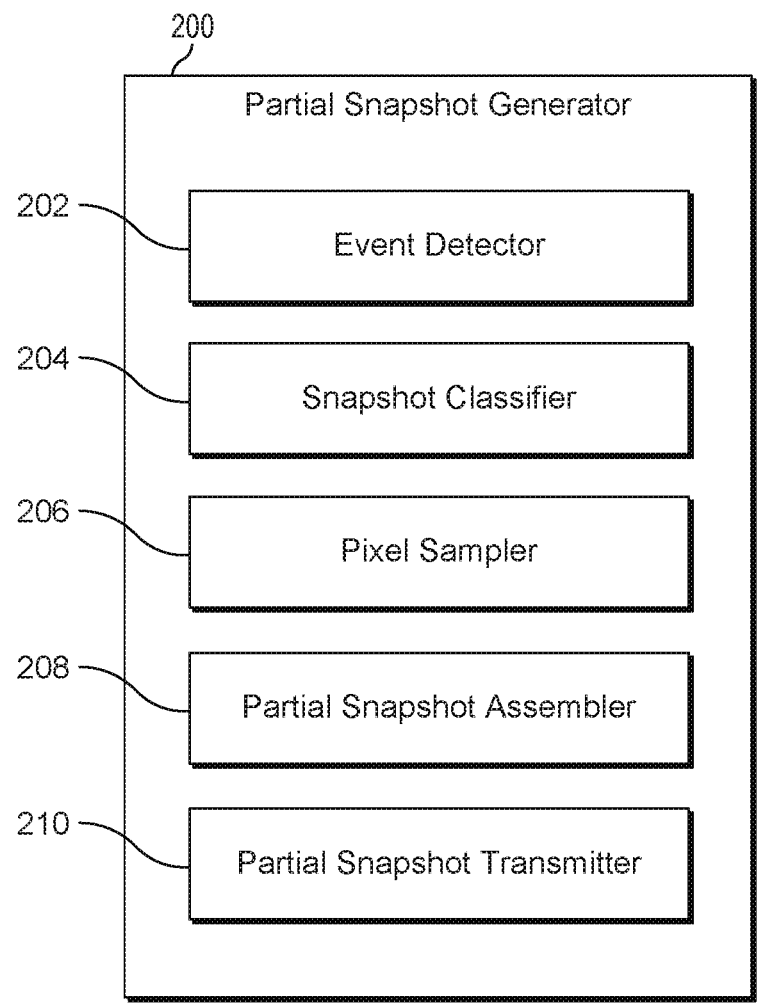
FIG. 2 is a block diagram of an example partial snapshot generator for partial snapshots for creating generalized snapshots.

FIG. 2 is a block diagram of an example partial snapshot generator 200, which may be similar to partial snapshot generator 124 of FIG. 1. Partial snapshot generator 200 may include an event detector 202, a snapshot classifier 204, a pixel sampler 206, a partial snapshot assembler 208 and a partial snapshot transmitter 210. Each of these components and partial snapshot generator 200 overall may each include instructions (e.g., stored on a machine-readable storage medium of client 120) that, when executed (e.g., by a processor of client 120), implement the functionality of the particular component. Alternatively or in addition, each of these components and partial snapshot generator 200 overall may include electronic circuitry (i.e., hardware) that implements the functionality of the particular component.

Event detector 202 may detect events that cause partial snapshot generator 200 to create partial snapshots. Partial snapshot generator 200 may (e.g., depending on its configuration) create partial snapshots in response to various events. For example, partial snapshot generator may create snapshots when users interact with certain portions of an application user interface. In this example, event detector 202 may detect such user interactions. As another example, partial snapshot generator may create snapshots when particular timing events occur, e.g., clock events, video or audio playback events or other timing events. In these examples, event detector 202 may detect such timing events.

Several of the descriptions herein may describe various routines that occur with respect to generating a single partial snapshot. However, it should be understood that the following descriptions may apply to generating multiple other partial snapshots, for example, in response to various other events.

Snapshot classifier 204 may classify each partial snapshot that is created or about to be created according to at least one classification scheme. For example, partial snapshots may be classified according to particular UI screens, screen views (e.g., particular buttons, windows, etc.), timestamps or time events, user actions, sensor data, other events or the like. Partial snapshots may be classified, for example, by the particular screen or view they capture and/or by the event that caused the partial snapshot to be created. Such classification information for a particular partial snapshot may be referred to as metadata, and may be sent to the monitoring system (e.g., 110) along with the partial snapshot. Snapshot classifier 204 may indicate the classification and/or metadata in various ways. For example, each classification may be associated with a particular unique identifier (ID).

In the example of partial snapshots being classified by the particular screen or view they capture, multiple partial snapshots (e.g., from multiple clients) may each be classified according to the same particular screen or view even though each of these partial snapshots may sample different pixels of the screen or view. As described below (e.g., with regard to pixel sampler 206), a partial snapshot may include a sampling of pixels dispersed over the image (e.g., screen or view) being captured, and different partial snapshots may include different samplings of pixels even though they are capturing the same screen or view. In this case, these different partial snapshots may still be classified according to the same screen or view, e.g., such that these snapshots can be used to create a generalized snapshot (e.g., by monitoring system 110). As one particular example, all partial snapshots related to a particular button of an application (e.g., a "Checkout" button) may be classified the same, even though each of these partial snapshots may sample different pixels of the button image.

In the example of partial snapshots being classified by timestamps or time events, multiple partial snapshots (e.g., from multiple clients) may each be classified according to a consistent time stamping scheme. For example, a system or web-based clock may be used. Alternately, a timestamp from a timer that starts on the client at some time may be used. As a specific example, partial screen shots may be generated by partial snapshot generator 200 in conjunction with a video playing on the related client or in conjunction with video being captured on the client using a camera device. In each of these cases, when the video or recording starts, a timer may start and may create timestamps that can be used to categorize partial snapshots. Various other manners of categorizing partial snapshots are contemplated by this disclosure as well.

Pixel sampler 206 may, for a particular partial snapshot, select which pixels of the total available UI screen or view are to be included in the partial snapshot, and may capture these pixels. The captured pixels are a portion of the total pixels included in the screen or view. For example, for a screen of size W*H, pixel sampler 206 may capture k (e.g., some percentage or other portion of the total pixels) pixels. Pixel sampler 206 may maintain a dispersion of the captured pixels over the total area of the screen or view and may prevent clustering of captured pixels within sub-areas of the total area. Pixel sampler 206 may capture enough pixels over the total area of the screen or view such that a generalized version of the screen or view can be reconstructed (e.g., by monitoring system 110) in conjunction with multiple other similarly categorized partial snapshots. Pixel sampler 206 may also prevent clustering of pixels in areas which may allow personal user information or confidential information in the screen or view to be deciphered by looking at the particular partial snapshot. A goal may be to include a small enough amount of data such that the included image data cannot be extrapolated. At the same time, including more data in each partial snapshot may allow for quicker creating of generalized snapshots (e.g., in the monitoring system).

Pixel sampler 206 may maintain a dispersion of the captured pixels and prevent clustering of captured pixels by using a "grid" sampling approach. An example grid sampling approach may include dividing the UI screen or view into a number of cells, e.g., arranged in a grid orientation. As a specific example, the approach may divide the UI screen or view into a grid of n*m cells (i.e., a grid of n horizontal rectangles and m vertical rectangles). The number of horizontal and vertical rectangles and the size of each rectangle may vary depending on the amount of pixel dispersion desired across the screen or view. Then, the approach may sample a number of pixels (e.g., k/(n*m) pixels) from each cell.

For the grid sampling approach, pixels may be selected from each cell in various ways. For example, pixel sampler 206 may select a number of random pixels from each cell. Alternatively, pixel sampler 206 may select a number of random pixels from one cell and then select the same pixel locations (e.g., within each cell) for the rest of the cell in the grid. Various other ways of selecting pixels from grids may be used.

Pixel sampler 206 may select pixels from the UI screen or view in manners other than a grid approach. For example, pixel sampler 206 may sample pixels using a screen or view wide random approach. Specifically, pixel sampler 206 may randomly sample k pixels out of a screen or view with dimensions of W*H pixels. As another example, pixel sampler 206 may use a scan line sampling approach. This approach includes selecting scan lines (e.g., horizontal and/or vertical pixel lines across the screen or view) from the screen or view. The vertical (or horizontal for vertical scan lines) position and spacing of the scan lines may be randomly selected or otherwise selected. The number of scan lines for a particular screen or view may be determined.

Regardless of the way pixel sampler 206 selects pixels from the screen or view, an example goal of the pixel sampler 206 may be to achieve a good coverage of pixels across the screen or view while ensuring variation of pixel selections from other partial snapshots. Then, when a monitoring system (e.g., 110) receives this partial snapshot and other partial snapshots, the goal is to have a number of pixels samples for each pixel location in the general snapshot image. The monitoring system may then determine each pixel of the general snapshot image by considering the samples for each pixel from the partial snapshots. A programmer, user or administrator of the partial snapshot generator could modify various parameters or setting to achieve a desired coverage of pixels samples and number of pixel samples for each pixel in the generalized snapshot. For example, if the rough number of users of the application (e.g., 122) were known and/or the rough number of users that work with a particular UI screen or view, then appropriate parameters (e.g., how many horizontal and vertical cells in the sampling grids, the number of pixels selected from each grid, etc.) could be chosen.

Partial snapshot assembler 208 may create a partial snapshot from the sampling of pixels determined by pixel sampler 206. More particularly, partial snapshot assembler 208 may assemble these pixels into an image file, digital file or some other type of binary data that includes a number of color pixels. Partial snapshot assembler 208 may, for example, use location information (e.g., X and Y coordinates) of the various sampled pixels to place the sampled pixels in the right location in the partial snapshot, or to record the right location such that these pixels can be used in the right location when they are used to create a generalized snapshot.

In some examples, the pixel sampling and assembling approaches described herein may consider the screen resolution of the UI screens displayed to users. For example, for different screen resolutions, pixel sampler 106 may select more or less pixels per cell (for the grid approach) or different pixels per cell. As another example, partial snapshot assembler 208 may assemble differently classified partial snapshots for different screen resolutions, even if the pixels are sampled from the same type of UI screen or view. In these examples, the classification or metadata information described above may account for screen resolution. Specifically, when clients send partial snapshots to the monitoring system, the accompanying metadata may include the screen resolution of the client device (e.g., 120), and/or of the application (e.g., 122). In other examples, the pixel sampling and assembling approaches described herein may accommodate different screen resolutions and may not classify partial snapshots as being different just because of different screen resolutions.

Partial snapshot transmitter 210 may send partial snapshots created by partial snapshot assembler 208 to at least one monitoring system (e.g., 110). As described above, each partial snapshot may only include a portion of the total pixels included in a full UI screen or view. Partial snapshot transmitter 210 may send only these pixels (e.g., in a condensed or compressed format) for each partial snapshot). This may result in various bandwidth benefits because full UI screens or views may not need to be sent over a network for each partial snapshot.

Partial snapshot transmitter 210 may also, for each partial snapshot, send related metadata to the monitoring system. Such metadata may relate to at least one classification of the partial snapshot, as described in more detail above. Then, this metadata may be used by the monitoring system to group partial snapshots that relate to the same classification (e.g., a particular screen, view, timestamp, etc,). Partial snapshot transmitter 210 may also send screen resolution information of the client to the monitoring system.

Partial snapshot transmitter 210 may continuously or regularly send partial snapshots related to at least one application. Thus, for example, when new versions of an application are released, the partial screen shots may change, and thus the monitoring system may update its generalized snapshots automatically and dynamically. To facilitate partial snapshot transmitter 210 to continuously or regularly send partial snapshots, various other components of partial snapshot generator 200 may function continuously or regularly. For example, event detector may continue to detect events of a particular type, even though a similar partial snapshot may have been sent for that type of event in the past. As another example, components 204, 206 and 208 may continuously or regularly perform their functions as described herein.

Figure 3:
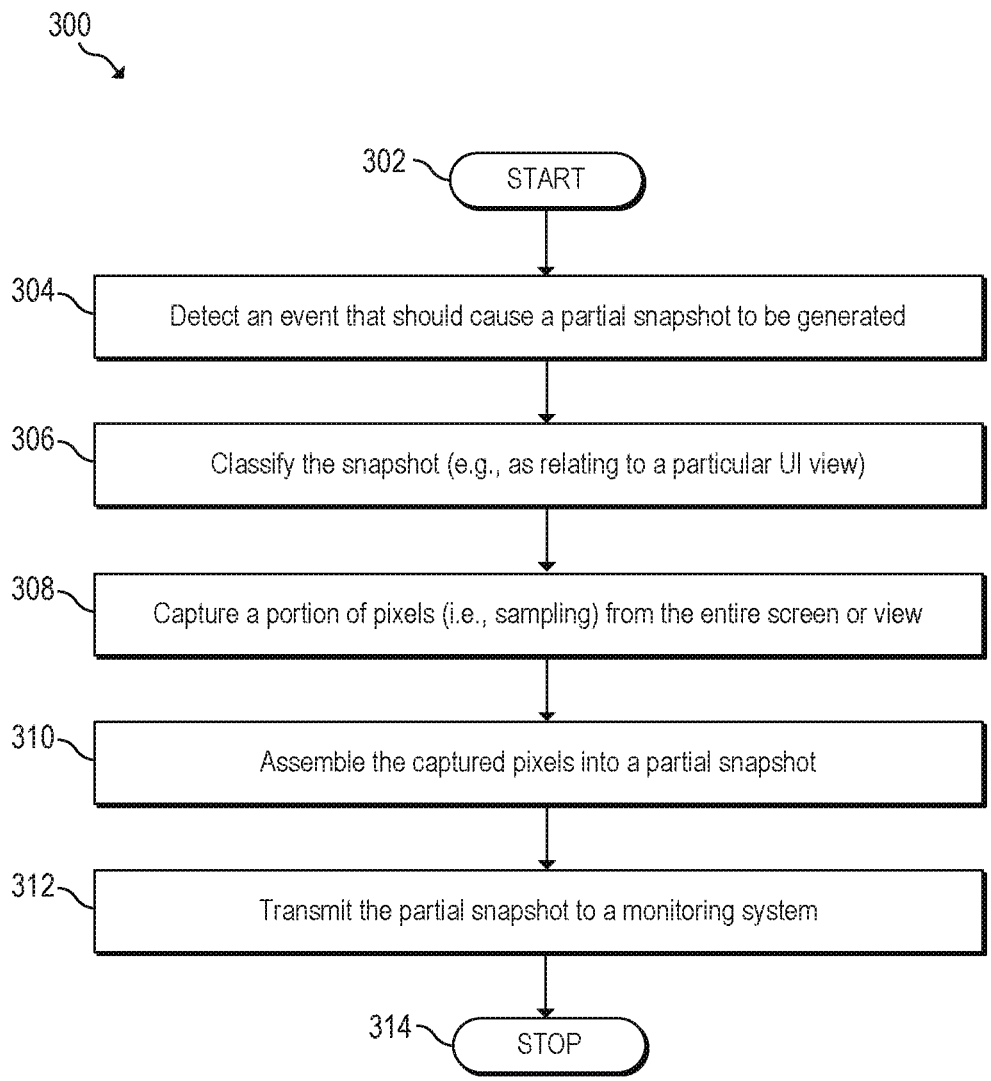
FIG. 3 is a flowchart of an example method for partial snapshots for creating generalized snapshots.

FIG. 3 is a flowchart of an example method 300 for partial snapshots for creating generalized snapshots. Method 300 may be described below as being executed or performed by a computing device, for example, clients 120, 130, 140, etc. of FIG. 1. Other suitable systems and/or computing devices may be used as well. Method 300 may be implemented in the form of executable instructions stored on at least one machine-readable storage medium of the computing device and executed by at least one processor of the computing device. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where a computing device (e.g., 120) may detect an event that should cause a partial snapshot to be generated. More details of this event detection are provided above with regard to event detector 202. At step 306, the computing device may classify the snapshot, for example, as relating to a particular UI screen, view, timestamp, etc. More details of this classification are provided above with regard to snapshot classifier 204. At step 308, the computing device may capture a portion of the pixels (i.e., sampling) from the entire UI screen or view. More details of this sampling are provided above with regard to pixel sampler 206. At step 310, the computing device may assemble the captured pixels into a partial snapshot. More details of this assembly are provided above with regard to partial snapshot assembler 208. At step 312, the computing device may transmit the partial snapshot to a monitoring system (e.g., 110 of FIG. 1). More details of this transmission are provided above with regard to partial snapshot transmitter 210. Method 300 may eventually continue to step 314, where method 300 may stop.

Figure 4:
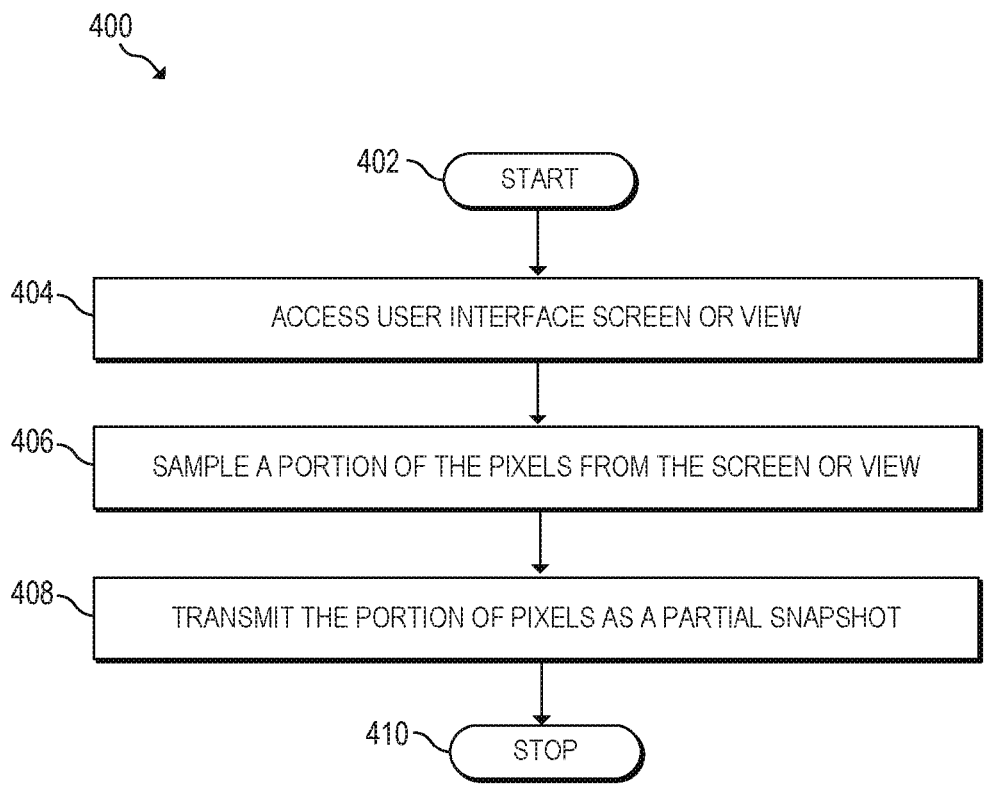
FIG. 4 is a flowchart of an example method for partial snapshots for creating generalized snapshots.

FIG. 4 is a flowchart of an example method 400 for partial snapshots for creating generalized snapshots. Method 400 may be described below as being executed or performed by a computing device, for example, computing device 500 of FIG. 5, or computing device 600 of FIG. 6. Other suitable systems and/or computing devices may be used as well. Method 400 may be implemented in the form of executable instructions stored on at least one machine-readable storage medium of the computing device and executed by at least one processor of the computing device. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where a computing device (e.g., 500 or 600) may, in response to an event, access a user interface screen or view associated with an application. The screen or view includes multiple pixels arranged over an area. At step 406, the computing device may sample the multiple pixels by capturing a portion of the total pixels included in the screen or view. The sampling may include maintaining a dispersion of the captured pixels over the area of the screen or view and preventing clustering of captured pixels within sub-areas of the area. At step 408, the computing device may transmit the captured portion as a partial snapshot to a system to create a generalized snapshot from the partial snapshot and other partial snapshots. Method 400 may eventually continue to step 410, where method 400 may stop.

Figure 5:
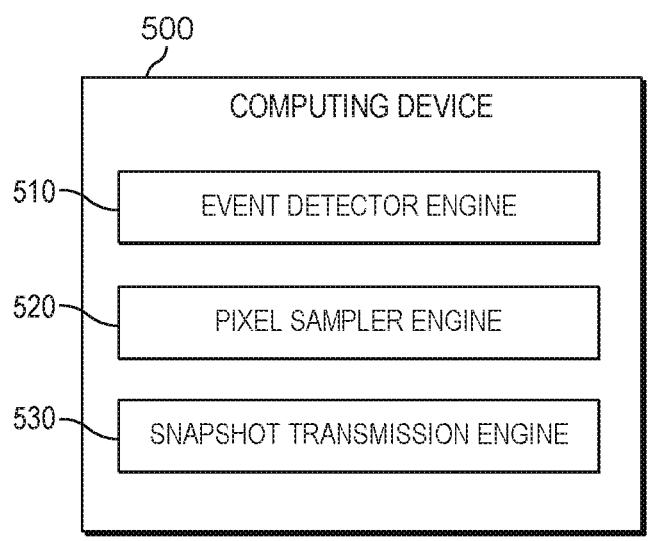
FIG. 5 is a block diagram of an example computing device for partial snapshots for creating generalized snapshots.

FIG. 5 is a block diagram of an example computing device 500 for partial snapshots for creating generalized snapshots. Computing device 500 may be any computing device capable of creating partial snapshots and transmitting them, e.g., over a network, to monitoring system (e.g., 110 of FIG. 1). Computing device 500 may be similar to clients 120, 130, 140, etc. of FIG. 1. In the embodiment of FIG. 5, computing device 500 includes an event detector engine 510, a pixel sampler engine 520 and a snapshot transmission engine 530. Event detector engine 510 may detect an event, for example, in a manner similar to event detector 202 of FIG. 2. Event detector engine 510 may be implemented in the form of executable instructions stored on at least one machine-readable storage medium of computing device 500 and executed by at least one processor of computing device 500. Alternatively or in addition, event detector engine 510 may be implemented in the form of one or more hardware devices including electronic circuitry for implementing the functionality of event detector engine 510.

Pixel sampler engine 520 may access, in response to the event, a user interface screen or view associated with an application. The screen or view includes multiple pixels arranged over an area. Pixel sampler engine 520 may sample the multiple pixels by capturing a portion of the total pixels included in the screen or view. The sampling may include maintaining a dispersion of the captured pixels over the area of the screen or view and preventing clustering of captured pixels within sub-areas of the area. Pixel sampler engine 520 may function in a manner similar to pixel sampler 206 and partial snapshot assembler 208 of FIG. 2 and perhaps other components of partial snapshot generator 200. Pixel sampler engine 520 may be implemented in the form of executable instructions stored on at least one machine-readable storage medium of computing device 500 and executed by at least one processor of computing device 500. Alternatively or in addition, pixel sampler engine 520 may be implemented in the form of one or more hardware devices including electronic circuitry for implementing the functionality of pixel sampler engine 520.

Snapshot transmission engine 530 may transmit the captured portion of the total pixels as a partial snapshot to a system (e.g., monitoring system 110 of FIG. 1) to create a generalized snapshot from the partial snapshot and other partial snapshots (e.g., from other clients such as 130, 140, etc.). Snapshot transmission engine 530 may function in a manner similar to partial snapshot transmitter 210 of FIG. 2. Snapshot transmission engine 530 may be implemented in the form of executable instructions stored on at least one machine-readable storage medium of computing device 500 and executed by at least one processor of computing device 500. Alternatively or in addition, snapshot transmission engine 530 may be implemented in the form of one or more hardware devices including electronic circuitry for implementing the functionality of snapshot transmission engine 530.

Figure 6:
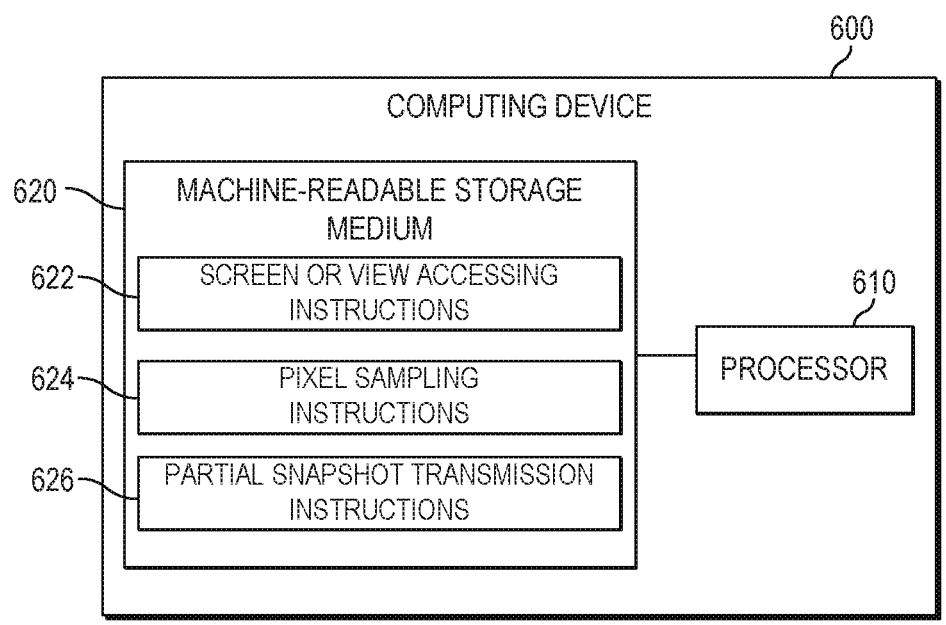
FIG. 6 is a block diagram of an example computing device for partial snapshots for creating generalized snapshots.

FIG. 6 is a block diagram of an example computing device 600 for partial snapshots for creating generalized snapshots. Computing device 600 may be any computing device capable of creating partial snapshots and transmitting them, e.g., over a network, to monitoring system (e.g., 110 of FIG. 1). Computing device 600 may be similar to clients 120, 130, 140, etc. of FIG. 1. In the embodiment of FIG. 6, computing device 600 includes a processor 610 and a machine-readable storage medium 620. Although the following descriptions refer to a single processor and a single machine-readable storage medium, the descriptions may also apply to a computing device with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular embodiment shown in FIG. 6, processor 610 may fetch, decode, and execute instructions 622, 624, 626 to create partial snapshots for creating generalized snapshots. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within computing device 600, as shown in FIG. 6. In this situation, the executable instructions may be "installed" on the computing device 600. Alternatively, machine-readable storage medium 620 may be a portable, external or remote storage medium, for example, that allows computing device 600 to download the instructions from the portable/external/remote storage medium. In this situation, the executable instructions may be part of an "installation package". As described herein, machine-readable storage medium 620 may be encoded with executable instructions for partial snapshots for creating generalized snapshots.

Referring to FIG. 6, screen or view accessing instructions 622, when executed by a processor (e.g., 610), may cause computing device 600 to access, in response to an event, a user interface screen or view associated with an application. The screen or view includes multiple pixels arranged over an area, Pixel sampling instructions 624, when executed by a processor (e.g., 610), may cause computing device 600 to sample the multiple pixels by capturing a portion of the total pixels included in the screen or view. The sampling may include maintaining a dispersion of the captured pixels over the area of the screen or view and preventing clustering of captured pixels within sub-areas of the area. Partial snapshot transmission instructions 626, when executed by a processor (e.g., 610), may cause computing device 600 to transmit the captured portion as a partial snapshot to a system to create a generalized snapshot from the partial snapshot and other partial snapshots.

The invention claimed is:

1. A method for creating a partial snapshot, the method comprising:

in response to an event, accessing, by a processor, a user interface screen or view associated with an application, wherein the screen or view includes multiple pixels arranged over an area, wherein a group of the multiple pixels are arranged to form human-readable text;

sampling, by the processor, the multiple pixels by capturing a portion of the multiple pixels included in the screen or view, wherein the sampling includes maintaining a dispersion of the captured pixels over the area of the screen or view to prevent capture of a sufficient number of the group of the multiple pixels to recreate the human-readable text from the sampled multiple pixels and preventing clustering of captured pixels within sub-areas of the area; and transmitting, by the processor, the captured portion as a partial snapshot to a system, the system being to create a generalized snapshot from the partial snapshot and other partial snapshots received from other clients.

2. The method of claim 1, wherein the sampling includes dividing the screen or view into multiple cells, and wherein the captured portion of the multiple pixels includes an equal number of pixels from each of the cells.

3. The method of claim 2, wherein the multiple cells are arranged in a grid arrangement over the area of the screen or view.

4. The method of claim 2, wherein, for each cell, the captured pixels are chosen at random locations within the cell.

5. The method of claim 2, wherein, for each cell, the captured pixels are chosen at locations within the cell that correspond to relative locations of captured pixels in the other cells.

6. The method of claim 1, wherein the sampling includes selecting scan lines across the screen or view, wherein each scan line is a horizontal or vertical line of pixels, and the spacing between the scan lines is selected randomly.

7. The method of claim 1, further comprising assigning a classification to the partial screenshot according to one or more of the following:
 a particular user interface screen;
 a particular user interface screen view;
 a particular clock time or timestamp; and
 a particular user action related to an application user interface.

8. The method of claim 7, wherein the transmission includes transmitting the classification to the system.

9. A computing device for creating a partial snapshot, the computing device comprising:
 a processor;
 a machine-readable storage medium on which is stored instructions that are to cause the processor to:
  detect an event;
  access, in response to the detected event, a user interface screen or view associated with an application, wherein the screen or view includes multiple pixels arranged over an area, wherein a group of the multiple pixels are arranged to form human-readable text; and
  sample the multiple pixels by capturing a portion of the total pixels included in the screen or view, wherein the sampling includes maintaining a dispersion of the captured pixels over the area of the screen or view to capture the group of the multiple pixels at a sufficiently low resolution to prevent recreation of the human-readable text from the sampled multiple pixels and preventing clustering of captured pixels within sub-areas of the area; and
  transmit the captured portion as a partial snapshot to a system, the system being to create a generalized snapshot from the partial snapshot and other partial snapshots received from other clients.

10. The computing device of claim 9, wherein the event is one or more of the following:
 a particular user action related to the user interface of the application; and
 a particular clock time or timestamp.

11. The computing device of claim 9, wherein to sample the multiple pixels, the instructions are further to cause the processor to divide the screen or view into multiple cells, and wherein the captured portion of the multiple pixels includes an equal number of pixels from each of the cells.

12. The computing device of claim 11, wherein the multiple cells are arranged in a grid arrangement over the area of the screen or view.

13. A non-transitory machine-readable storage medium encoded with instructions for creating a partial snapshot, the instructions executable by a processor of a computing device to cause the computing device to:
 access, in response to an event, a user interface screen or view associated with an application, wherein the screen or view includes multiple pixels arranged over an area;
 sample the multiple pixels by capturing a portion of the total pixels included in the screen or view, wherein the sampling includes maintaining a dispersion of the captured pixels over the area of the screen or view and preventing clustering of captured pixels within sub-areas of the area, and wherein the sampling includes selecting scan lines across the screen or view, wherein each scan line is a horizontal or vertical line of pixels, and the spacing between the scan lines is selected randomly; and
 transmit the captured portion as a partial snapshot to a system, the system being to create a generalized snapshot from the partial snapshot and other partial snapshots received from other clients.

14. The machine-readable storage medium of claim 13, wherein the instructions are further executable by a processor of the computing device to cause the computing device to assign a classification to the partial screenshot according to one or more of the following:
 a particular user interface screen,
 a particular user interface screen view
 a particular clock time or timestamp, and
 a particular user action related to an application user interface;
 wherein the transmission includes transmitting the classification to the system.

15. The computing device of claim 9, wherein to sample the multiple pixels, the instructions are further to cause the processor to select scan lines across the screen or view, wherein each scan line is a horizontal or vertical line of pixels, and the spacing between the scan lines is selected randomly.

* * * * *